Patented May 27, 1941

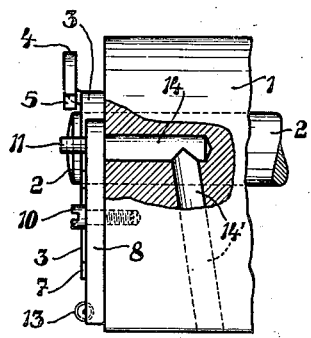
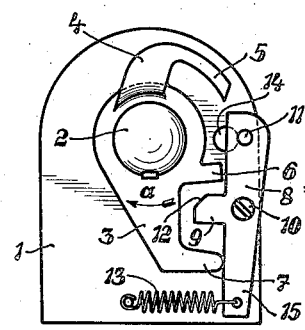
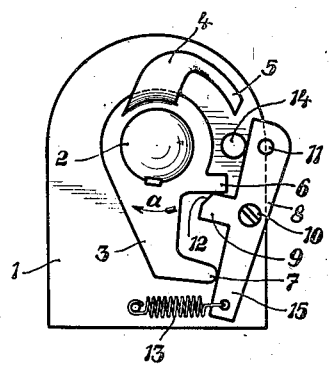
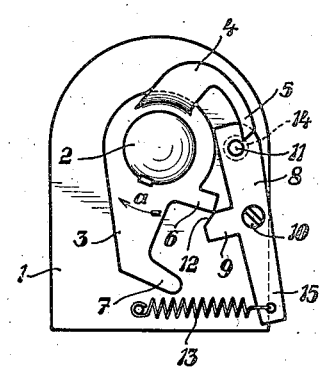
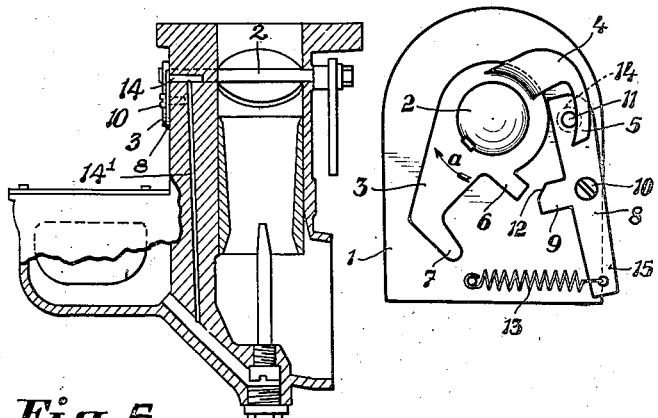
Alexander Abramson
INVENTOR

2,243,072

UNITED STATES PATENT OFFICE 2,243,072

METHOD AND APPARATUS FOR THE APPLICATION OF AERATING AIR TO CARBURETORS FOR INTERNAL COMBUSTION ENGINES

Alexander Abramson, Prague, Czechoslovakia

Application February 10, 1937, Serial No. 125,161
In Czechoslovakia September 9, 1936

6 Claims. (Cl. 261—47)

The employment of so-called aerating air in the operation of carburetors is known. The application of the aerating air is effected in order to dilute the fuel with air before its exit from the atomizer-nozzle, and produces a kind of preliminary atomization of the fuel, in order to effect the formation of a complete mixture of fuel and air after the exit from the openings of the atomizer.

Various methods are known for using aerating air in carburetors. In one, the mixture of the aerating air supplied to the fuel ducts of the carburetor or to the atomizer-nozzle is constant for all speeds and all loads of the motor; in others, the aerating air mixture is made dependent upon the position of the throttle-valve of the carburetor. In the latter case the control of the aerating air is very incomplete, because the control of the aerating-air mixture dependent upon the position of the carburetor throttle-valve is effected by means of a slide which takes the form of a hollow ring disposed on the spindle of the throttle-valve of the carburetor. This slide is movable on the slide seat and is provided with orifices which are covered by the orifices of the slide seat.

Practical experience has however shown that the influence of the pressure ratio prevailing in the intake pipe of the motor on the flow of fuel in the ducts connecting the float chamber with the atomizer-nozzle of the carburetor cannot be altered by the application of an aerating air mixture controlled by means of the said slide. In the methods heretofore employed on gradual opening of the throttle-valve a constant amount of aerating air is admitted in a first rising and then falling mixture through the slide orifices into the fuel ducts. In this kind of control of the aerating air mixture, however, an inevitable sudden fall in the speed is observed in the speed range of the motor, if the closing or opening of the slide-seat orifices are so adjusted by the slide that the motor runs well in the low speed range and the specific consumption of fuel is small. If the slide openings are so controlled that no fall in the speed of the motor takes place in the middle speed range, the motor runs unevenly in the lower speed range and the specific consumption at this range of speed of the motor rises considerably.

Furthermore, the hollow ring of the said slide has a great disadvantage in operation. The condensed water from the air passing through the hollow ring collects within the hollow ring. This condensate collects in the orifices of the slide, whereby the cross-section of these orifices is automatically altered. This results in a sharp rise in the specific consumption of fuel and a falling-off of the motor output. The above mentioned disadvantages during long runs considerably diminish the economy of operation resulting from the use of the aerating air, whereby the value of the aerating air is reduced and generally lost.

According to the present invention a completely uniform running of the motor and a small specific consumption of fuel are effected throughout the whole speed range of the motor, as the influence of the pressure ratio prevailing in the intake pipe of the motor on the flow of fuel in the fuel ducts of the carburetor is not done away with as was intended in the methods hitherto employed for the application of aerating air, but the aerating air mixture according to the invention is so controlled that it promotes the efficiency of the carburetor dependent upon the pressure ratio in the intake-pipe. In the middle speed range of the motor, in which the degree of the vacuum is not noticeably altered, the cross-sectional area of the opening through which the air enters into the fuel duct is maintained constant. When the speed increases, the area of this opening is gradually reduced to zero. This method for the control of the aerating air mixture can be carried out by means of mechanical, hydraulic, pneumatic or electrical apparatus.

The accompanying drawing illustrates, by way of example, mechanical means for carrying out the method according to the invention.

Figs. 1 and 2 illustrate the general assembly, Fig. 1 being in front elevation and Fig. 2 in side elevation, partly in section.

In Figs. 3, 4 and 5 the apparatus is illustrated at various positions of opening of the carburetor throttle-valve.

Figure 6 is a substantially longitudinal sectional view of a conventional carburetor equipped with my improved air bleed control.

Referring to the drawing and particularly to Figs. 1 and 2, the duct 14' is connected in suitable manner with the fuel ducts and opens into the channel 14 in the slide valve 1. On the slide valve 1 is disposed an oscillatable valve member 8 rotatable on the pin 10. This valve member has the form of a two-armed lever, one arm 15 of which is acted upon by a spiral tension spring 13. By the turning movement of the valve member 8 about the pin 10, the open end 14 of the aerating air duct 14' is closed or opened. The member 8 is furthermore provided with a short arm 9, so that the opening or closing of the opening 14 can be controlled both by means of the arm 15 and also by means of the arm 9. On the spindle 2 of the throttle-valve is keyed a cam 3, having projections 6 and 7 on its lower part and a hook 5 on its upper part. The inner edge of this hook and the outer edge of the cam form a curved slot concentric with the axis of the pin 2. The hook 5 is offset with respect to the plane of the cam 3, so that its distance from the slide-valve seat 1 is somewhat greater than the thickness of the lever 8.

The apparatus illustrated functions as follows:

On starting up the motor, the parts take up the relative position illustrated in Fig. 1. As can be seen the valve member 8 covers a part of the opening 14. The extent to which the orifice 14 is open on starting is adjusted to suit the motor requirements at its lowest idling speed. Spring 13 draws the arm 15 of the valve member 8 against the projection 7 of the cam 3. As the carburetor or throttle-valve 19 begins to move from closed position, the cam 3 also moves. The projection 7 of the cam 3 is moved clockwise in the direction of the arrow a and the spring 13 turns the valve member 8 about the pin 10 to increase the uncovered cross-sectional area of the orifice 14. The position of the valve member 8, illustrated in Fig. 3, corresponds to an opening of the carburetor throttle-valve at which the motor reaches the middle range of its speed. On further opening the throttle-valve in the direction of the arrow a, the orifice 14 remains permanently open until the projection 6 of the cam 3 begins to act on the short arm 9 of the valve member 8. At this moment, and on continued movement of the cam 3 in the direction of the arrow a, the projection 6 begins to press down on the arm 9 and to move the member 8 anti-clockwise or opposite to its original direction of movement, so that the member 8 begins to close the orifice 14. This closing movement continues until the orifice 14 is completely closed, as illustrated in Fig. 4, when the motor is running at high speed. On further movement of the cam in the direction of the arrow a, just before the projection 6 slips by the end of the arm 9 the hook 5 on the cam 3 embraces a pin 11 on the member 8 to prevent the spring 13 moving the valve member 8 into open position. The member 8 remains in this position as the throttle valve is opened further up to its completely open position. On movement of cam 3 in the opposite direction, that is to say, on closing of the throttle-valve, the motion of the member 8 is reversed.

By a suitable choice of the proportions of the arms 9 and 15 of the valve member 8, on which the projections 6 and 7 of the cam 3 act, relative to the arm opening and closing the opening 14, the velocity of opening and closing the opening 14 and the time at which full opening of the orifice 14 is obtained, as well as the time at which the orifice begins to close, can be so adjusted that the motor functions perfectly and its economical operation is ensured. The projections 6 and 7 of the cam 3 can be constructed adjustably in a simple and cheap manner so that they can be adjusted to suit the proportions of the above-mentioned arms of the slide 8.

In order that the hook 5 of the cam 3 may embrace the pin 11 of the valve member 8 at the proper time, the end of the short arm 9 of the member 8 is beveled at 12. The valve member 8 is held in position by the engagement of this beveled part 12 with the projection 6 of the cam 3 from the position shown in Fig. 4, until the hook 5 has engaged the pin 11. This is necessary, in order to avoid the spring 13 turning the valve member 8 clockwise and thus opening the orifice 14.

The accompanying drawing illustrates one form of construction of the invention, by way of example, in which the valve member 8 is constructed as a two-armed lever swingable about the pin 10. It is evident that the valve member 8 might be constructed as a one-armed lever without departing from the scope of the invention. Furthermore, there is no departure from the invention if, in place of the valve member 8 and the cam 3 acting directly on each other, they act indirectly by means of a plurality of levers or other devices. The essence of the invention consists in the opening, through which the aerating air is admitted to the carburetor, having temporarily a constant cross-section for speed chosen or predetermined by the peculiarities of the motor, which is gradually reduced to a complete closure of the orifice at high speed.

The apparatus described can be mounted either directly on the body of the carburetor and the cam 3 keyed on the spindle of the throttle-valve or it may be mounted at any other desired place and the rate of flow of the aerating air can be regulated by a distance control device.

What is claimed is:

1. Method of controlling air-fuel mixtures for internal combustion engines, comprising mixing air with the liquid fuel before its exit from the atomizer nozzle and gradually throttling the flow of such air to a predetermined fraction as the throttle-valve approaches its fully closed position, and gradually throttling the flow of said air to complete interruption thereof, as the throttle-valve approaches its open position, while permitting substantially unrestricted flow of such air over a considerable range of throttle-valve positions intermediate the nearly closed and nearly open positions.

2. Apparatus for diluting liquid fuel with air before its exit from the atomizer-nozzle, comprising a passage for the flow of aerating air for such purpose, a valve controlling the extent of opening of such passage, means connected to the throttle-valve for holding said aerating air valve in a partially closed position, while said throttle-valve is closed, and opening the aerating-air valve as the throttle-valve moves from its closed position, and means connected to the throttle valve for closing the aerating-air valve as the throttle-valve approaches its fully open position.

3. Apparatus as in claim 2, in which the aerating-air valve is pivotally mounted on a pin parallel to the throttle-valve spindle and which also comprises a cam fixedly mounted on said spindle having two projections, one projection being arranged to move the aerating-air valve towards its partially closed position when the throttle-valve moves towards its closed position and the other projection being arranged to move the aerating-air valve towards closed position when the throttle valve moves towards its fully open position.

4. Apparatus for the control of aerating air for carburetors of internal combustion engines, comprising a combination of pivotally mounted levers including control and controlled levers, means to establish an operative connection between the control lever and the throttle-valve for turning the control lever with said valve, and means moving with the control lever for acting on the controlled lever so that, upon opening of the throttle valve the controlled lever first performs a rotary movement increasing gradually the cross-section of an orifice through which the aerating air is admitted to the carburetor, second maintains constant this cross-section of the orifice for a given range of opening of the throttle-valve, and third gradually reduces the cross-section of the orifice to a complete closure, as the throttle-valve approaches its fully open position.

5. Apparatus according to claim 4, wherein said means moving with the control lever are formed as projections adapted to engage the controlled lever, and which also includes spring means for maintaining mutual contact between said levers.

6. Apparatus according to claim 4, wherein the controlled lever is spring-controlled and the control and controlled levers are provided with complementary pin and slot-engaging means for limiting the action of the spring.

ALEXANDER ABRAMSON.